US011880809B2

(12) United States Patent
Williams et al.

(10) Patent No.: US 11,880,809 B2
(45) Date of Patent: Jan. 23, 2024

(54) BLOCKCHAIN CROSS-CHAIN NON-FUNGIBLE TOKEN EXCHANGE

(71) Applicant: Frontage Road Holdings, LLC, Wilmington, DE (US)

(72) Inventors: Josh Williams, San Francisco, CA (US); Raymond A. Chiapuzio, Eugene, OR (US)

(73) Assignee: Frontage Road Holdings, LLC, Wilmington, DE (US)

( * ) Notice: Subject to any disclaimer, the term of this patent is extended or adjusted under 35 U.S.C. 154(b) by 388 days.

(21) Appl. No.: 17/067,167

(22) Filed: Oct. 9, 2020

(65) Prior Publication Data

US 2021/0133700 A1 May 6, 2021

Related U.S. Application Data

(60) Provisional application No. 62/913,559, filed on Oct. 10, 2019.

(51) Int. Cl.
*G06Q 20/06* (2012.01)
*G06Q 20/38* (2012.01)
(Continued)

(52) U.S. Cl.
CPC ....... *G06Q 20/065* (2013.01); *G06Q 20/3829* (2013.01); *H04L 9/0643* (2013.01); *H04L 9/3213* (2013.01); *H04L 9/3247* (2013.01); *G06Q 2220/00* (2013.01); *H04L 9/50* (2022.05); *H04L 2209/56* (2013.01)

(58) Field of Classification Search
CPC .................... G06Q 20/00–425; H04L 9/00–50
See application file for complete search history.

(56) References Cited

U.S. PATENT DOCUMENTS 10,320,569 B1 6/2019 Wentz et al.
10,404,471 B1 9/2019 Griffin et al.
(Continued)

OTHER PUBLICATIONS

Andreas M. Antonopoulos, Mastering Bitcoin, Dec. 1, 2014, O'Reilly Media, Inc. (Year: 2014).*
(Continued)

*Primary Examiner* — Ari Shahabi
(74) *Attorney, Agent, or Firm* — Hamilton, Brook, Smith & Reynolds, P.C.

(57) ABSTRACT

A system and corresponding method exchange a nonfungible token (NFT) via blockchain cross-chain fungible token transfers. The system comprises first and second blockchains. The first blockchain holds the NFT in a first escrow digital wallet. The NFT is available for trade by a seller and is associated with a trade value. The first blockchain monitors a balance of fungible tokens, owned by a buyer, that are transferred from a second blockchain to a second escrow digital wallet of the first blockchain. In response to detecting that the balance monitored represents the trade value, the first blockchain transfers, simultaneously, (i) the NFT from the first escrow digital wallet to a first digital wallet of the first blockchain, the first digital wallet owned by the buyer, and (ii) the balance of fungible tokens from the second escrow digital wallet to a second digital wallet of the second blockchain, the second digital wallet owned by the seller.

11 Claims, 5 Drawing Sheets

(51) Int. Cl.
*H04L 9/32* (2006.01)
*H04L 9/06* (2006.01)
*H04L 9/00* (2022.01)

(56) References Cited

U.S. PATENT DOCUMENTS

| | | | |
|---|---|---|---|
| 10,537,807 | B2 | 1/2020 | Farudi et al. |
| 10,579,974 | B1 | 3/2020 | Reed |
| 10,581,847 | B1 | 3/2020 | Sun et al. |
| 10,742,398 | B2 | 8/2020 | Rosenoer et al. |
| 10,751,628 | B2 | 8/2020 | Packin et al. |
| 11,288,736 | B1* | 3/2022 | Jette ............... H04L 63/123 |
| 11,295,359 | B1 | 4/2022 | Mullins et al. |
| 11,308,487 | B1* | 4/2022 | Foster ............... G06Q 20/3829 |
| 11,455,642 | B1 | 9/2022 | Jameson et al. |
| 11,468,431 | B2 | 10/2022 | Williams et al. |
| 2018/0349201 | A1 | 12/2018 | Clark |
| 2019/0051390 | A1 | 2/2019 | Shah |
| 2019/0158275 | A1 | 5/2019 | Beck |
| 2019/0304012 | A1 | 10/2019 | Ramirez et al. |
| 2019/0366475 | A1 | 12/2019 | Scarselli et al. |
| 2019/0370788 | A1 | 12/2019 | Aronson |
| 2020/0038761 | A1 | 2/2020 | Packin et al. |
| 2020/0042989 | A1* | 2/2020 | Ramadoss ............ G06Q 20/065 |
| 2020/0118091 | A1 | 4/2020 | Bartrim et al. |
| 2020/0143405 | A1 | 5/2020 | Tucker |
| 2020/0160320 | A1 | 5/2020 | Williams et al. |
| 2020/0184431 | A1 | 6/2020 | Sinmao et al. |
| 2021/0110360 | A1 | 4/2021 | Williams et al. |
| 2021/0110384 | A1 | 4/2021 | Vikstrom et al. |
| 2021/0326813 | A1 | 10/2021 | Wang et al. |
| 2021/0365930 | A1* | 11/2021 | Fay .................. H04L 43/08 |
| 2022/0051235 | A1 | 2/2022 | Ohashi et al. |
| 2022/0084013 | A1 | 3/2022 | Kulkarni et al. |
| 2023/0118511 | A1 | 4/2023 | Williams et al. |

OTHER PUBLICATIONS

Katalyse.io, What are Sidechains and Childchains?, Aug. 23, 2018, HackerNoon, hackernoon.com, downloaded Jul. 7, 2022. https://hackermoon.com/what-are-sidechains-and-childchains-7202cc9e5994, 7 pages.

Tate, S., et al., "Performance Evaluation of TPM-based Digital Wallets", downloaded on Apr. 13, 2023 at 20:49:40 UTC from IEEE Xplore, 8 pages.

Oraclize Dev Community, Oraclize, Nov. 20, 2018.

* cited by examiner

BLOCKCHAIN CROSS-CHAIN NON-FUNGIBLE TOKEN EXCHANGE

RELATED APPLICATION(S)

This application claims the benefit of U.S. Provisional Application No. 62/913,559, filed on Oct. 10, 2019. The entire teachings of the above application is incorporated herein by reference.

BACKGROUND

A blockchain is a peer-to-peer, electronic ledger which is implemented as a computer-based decentralized, distributed computer-implemented system made up of blocks which, in turn, are made up of transactions. Each transaction is a data structure that encodes the transfer of control of a digital asset between participants in the blockchain computer-implemented system, and includes at least one input and at least one output. Each block contains a hash of the previous block so that blocks become chained together to create a permanent, unalterable record of all transactions which have been written to the blockchain since its inception. Transactions contain small programs, known as scripts, embedded into their inputs and outputs, which specify how and by whom the outputs of the transactions can be accessed.

For a transaction to be written to the blockchain, it must be "validated." Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it should be i) validated by the first node that receives the transaction—if the transaction is validated, the node relays it to the other nodes in the network; and ii) added to a new block built by a miner; and iii) mined, i.e., added to the public ledger of past transactions.

Blockchain may be used for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results. In respect of commercial transactions, for example, these may involve the transfer of property rights and/or assets. Such assets may include real property, personal property including both tangible and intangible property), digital assets such as software, for example, or any other type of asset. In the digital economy, there is often an expectation that exchanges and transfers will be performed in a timely manner and across vast distances. This expectation, along with practical, technical limitations, mean that traditional forms of asset transfer, such as physical delivery of hardcopy of documents representing a contract, negotiable instrument, etc., or the tangible asset itself, is not desirable. Thus, smart contracts can provide enhanced control, efficiency, and speed of transfer.

An area of blockchain-related interest is the use of "tokens" to represent and transfer assets via the blockchain. A token serves as an identifier that allows the real-world item, that is, an asset, to be referenced from the blockchain. Similar to physical assets, the tokens that represent them may have many properties, one of which is fungibility or non-fungibility. In economics, fungibility refers to the equivalence or interchangeability of each unit of a commodity with other units of the same commodity. Fungible tokens (FTs) are tokens that can be exchanged for any other token with the same value.

Fungible tokens are uniform, that is, FTs of the same type are identical in specification, each fungible token (FT) is identical to another FT of the same type. FTs are divisible into smaller amounts. Similar to currency, where bills can be divided into coins of an equivalent value, FTs are divisible. As such, a fraction of an FT can be transferred between users. Nonfungible tokens (NFTs), however, cannot be replaced with other tokens of the same type. NFTs represent nonfungible assets. Nonfungible assets have unique information or attributes. Each NFT is unique and differs from other tokens of the same class. For example, while plane tickets from and to a same destination may look the same, each one has a different passenger name, seat number, etc., and, therefore, is unique. In contrast to FTs, NFTs cannot be divided, the elementary unit of the NFT is the token itself.

SUMMARY

Blockchain technology is widely associated with the exchange of interchangeable digital assets, from payment systems like Zcash (ZEC) and Libra to platforms like Ethereum and Substrate, using what are known as fungible tokens. However, nonfungible tokens are generally not worth the same as any other token or currency. NFTs are tokenized versions of digital or real-world assets. They can function as verifiable proofs of authenticity and ownership within a blockchain network. In general, NFTs are not interchangeable with each other and they introduce scarcity to the digital world.

To act as a medium of exchange, each individual unit must be interchangeable with any other equivalent individual unit. A one-dollar bill is interchangeable with any other genuine one-dollar bill. While NFTs can be bought and sold using fungible tokens, NFTs are their own asset class and are not exchangeable like fungible tokens. Identifying information is embedded in the NFTs' smart contracts, which is what makes each nonfungible token unique. In general, this uniqueness makes nonfungible tokens unsuitable for conventional crypto trading purposes and token currency exchanges but ideal for recording and storing the ownership of digital items like collectibles, games and even art.

According to an example embodiment, a computer-implemented method for blockchain cross-chain nonfungible token exchange comprises holding a nonfungible token (NFT) in a first escrow digital wallet of a first blockchain network. The NFT available may be for trade by a seller and associated with a trade value. The computer-implemented method may comprise monitoring a balance of fungible tokens owned by a buyer and transferred from a second blockchain network to a second escrow digital wallet of the first blockchain network. In response to detecting that the balance monitored represents the trade value, the computer-implemented method may comprise transferring, simultaneously, (i) the NFT from the first escrow digital wallet to a first digital wallet of the first blockchain network, the first digital wallet owned by the buyer, and (ii) the balance of fungible tokens from the second escrow digital wallet to a second digital wallet of the second blockchain network, the second digital wallet owned by the seller.

The NFT may represent a nonfungible physical asset owned by the seller. Ownership of the nonfungible physical asset may be transferred from the seller to the buyer due to completion of the transferring of (i) and (ii).

The first and second escrow digital wallets may be associated with a same or different trusted third party.

The computer-implemented method may further comprise transferring the fungible tokens, owned by the buyer, from a third digital wallet of the second blockchain network to the second escrow digital wallet, the third digital wallet owned by the buyer.

The computer-implemented method may further comprise transferring the fungible tokens from the third digital wallet to the second escrow digital wallet via a cross-chain communications network; and transferring the balance of fungible tokens from the second escrow digital wallet to the second digital wallet via the cross-chain communications network.

Transferring the fungible tokens from the third digital wallet to the second escrow digital wallet may include performing multiple fungible token transfers each associated with a respective value that is less than the trade value.

The NFT may be associated with an expiration term. In an event the expiration term expires, the computer-implemented method may further comprise transferring the balance of fungible tokens from the second escrow digital wallet of the first blockchain network to a third digital wallet of a second blockchain network, the third digital wallet owned by the buyer; and transferring the NFT from the first escrow digital wallet to a fourth digital wallet of the first blockchain network. The fourth digital wallet may be owned by the seller.

The computer-implemented method may further comprise detecting expiry of the expiration term. The detecting may be performed via a smart contract.

The monitoring, detecting, and transferring may be performed via a smart contract.

The first and second blockchain networks may be configured to communicate via a cross-chain communications network to enable transfer of fungible tokens therebetween. The cross-chain communications network may be based on at least one of a Polkadot, Cosmos, International Blockchain Consulting (IBC), or Interledger network.

According to another example embodiment, a system for blockchain cross-chain nonfungible token exchange may comprise a first blockchain network and a second blockchain network. The first blockchain network may be configured to hold a nonfungible token (NFT) in a first escrow digital wallet. The NFT may be available for trade by a seller and associated with a trade value. The second blockchain network may be communicatively coupled to the first blockchain network via a cross-chain communications network. The first blockchain network may be configured to monitor a balance of fungible tokens owned by a buyer and transferred from the second blockchain network to a second escrow digital wallet of the first blockchain network via the cross-chain communications network. In response to detecting that the balance monitored represents the trade value, the first blockchain network may be configured to transfer, simultaneously, (i) the NFT from the first escrow digital wallet to a first digital wallet of the first blockchain network, the first digital wallet owned by the buyer, and (ii) the balance of fungible tokens from the second escrow digital wallet to a second digital wallet of the second blockchain network via the cross-chain communications network. The second digital wallet may be owned by the seller.

Alternative system embodiments parallel those described above in connection with the example computer-implemented method embodiments.

It should be understood that example embodiments disclosed herein can be implemented in the form of a method, apparatus, computer-implemented system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
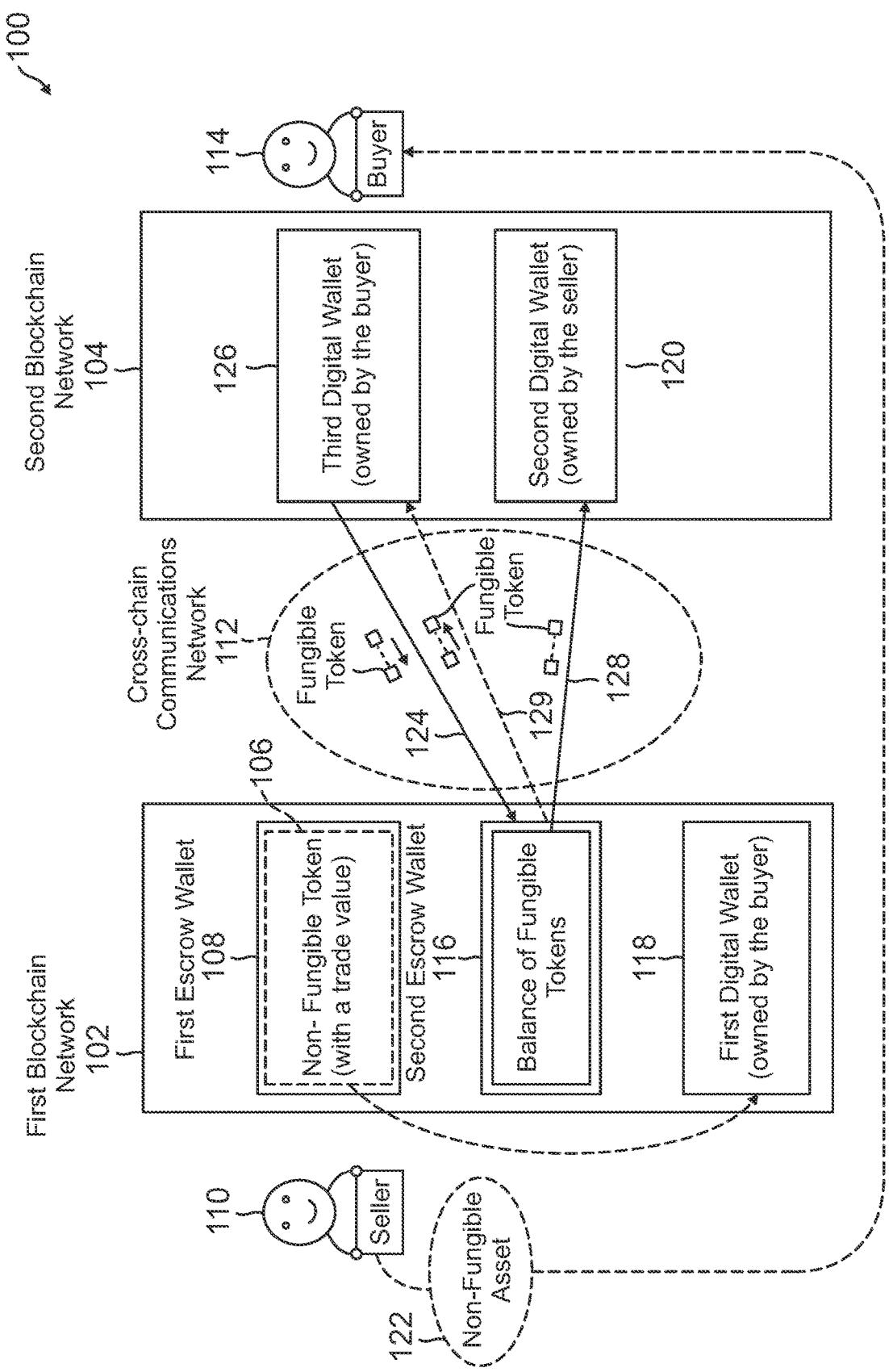
FIG. 1 is a block diagram of an example embodiment of a system for blockchain cross-chain nonfungible token exchange.

A description of example embodiments follows.

It should be understood that the term "blockchain" as used herein includes all forms of electronic, computer-based, distributed ledgers. These include consensus-based blockchain and transaction-chain technologies, permissioned and un-permissioned ledgers, shared ledgers and variations thereof. While Bitcoin and Ethereum may be referred to herein for the purpose of convenience and illustration, it should be noted that the disclosure is not limited to use with the Bitcoin or Ethereum blockchains and alternative blockchain implementations and protocols fall within the scope of the present disclosure.

In general, blockchain is a write-once, append-many type electronic ledger. Blockchain is an architecture that allows disparate users to make transactions and creates an unchangeable record of those transactions. In order to move anything of value over any kind of blockchain, a network of nodes must first agree that a corresponding transaction is valid. As a peer-to-peer network, combined with a distributed time-stamping server, blockchain ledgers can be managed autonomously to exchange information between disparate parties; there's no need for an administrator. In effect, the blockchain users are the administrator.

Blockchain's rapid development has given rise to many different kinds of chains, leading to cross-chain technology. Cross-chain, as its name suggests, allows the transmission of value and information between different blockchains. Within a single blockchain, a miner, disclosed above, has visibility to all transactions on the single blockchain, however, the miner does not have visibility, for example, to pending transactions on another blockchain. According to an example embodiment, a nonfungible token (NFT) may be exchange, cross-chain, securely, despite such lack of visibility.

According to an example embodiment, a seller may exchange (i.e., trade) an NFT on a first blockchain for currency of a buyer, where the currency is on a second blockchain. As the NFT may be valuable, for example, a single CryptoKittie may cost $100,000, exchanging such a valuable item cross-chain, that is, across blockchains, may be risky given the lack of transaction visibility of one blockchain relative to another. It should be understood that a CryptoKittie is an example of an NFT and that an NFT disclosed herein may be any suitable NFT and is not limited to a CryptoKittie.

While fungible tokens may be divisible, enabling multiple smaller exchanges of the fungible tokens to reduce risk, NFTs are not divisible. An example embodiment enables an NFT exchange to be made, securely, cross-chain, that is, across blockchains. According to an example embodiment, the NFT may be placed into a first escrow digital wallet on a first blockchain and employ multiple fungible cross-chain transactions to transfer fungible tokens, incrementally, from a second blockchain into a second escrow digital wallet of the first blockchain. A minor on the first blockchain may monitor such fungible token transfer to determine when a balance of fungible tokens in the second escrow digital wallet reaches a trade value for the NFT.

In an event the balance reaches the trade value, the NFT may be released from the first escrow digital wallet to a wallet of the buyer on the first blockchain. Simultaneous with such release of the NFT, the balance of fungible tokens may be released from the second escrow digital wallet to a wallet of the seller that is on the second blockchain.

Further, an example embodiment may "unwind" an exchange of the NFT that is in progress based on an expiration term associated with the NFT held in the first escrow. According to an example embodiment, the NFT may be released from the first escrow digital wallet to a wallet of the seller on the first blockchain in an event the expiration term expires before the balance reaches the trade value. In such an event, the balance is returned, simultaneously, back to the buyer by transferring the balance to a wallet of the buyer that is located on the second blockchain, as disclosed in further detail below with regard to FIG. 1

FIG. 1 is a block diagram of an example embodiment of a system 100 for blockchain cross-chain nonfungible token exchange. The system 100 comprises a first blockchain network 102 and a second blockchain network 104. The first blockchain network 102 may be configured to hold an NFT 106 in a first escrow digital wallet 108. The NFT 106 may be available for trade by a seller 110 and associated with a trade value (not shown). The second blockchain network 104 may be communicatively coupled to the first blockchain network 102 via a cross-chain communications network 112.

The cross-chain communications network 112 may be based on at least one of a Polkadot, Cosmos, International Blockchain Consulting (IBC), or Interledger network; however, it should be understood that an example embodiment may employ any suitable network and protocol that enables different blockchains to interoperate.

The first blockchain network 102 may be configured to monitor a balance of fungible tokens (not shown) owned by a buyer 114 and transferred from the second blockchain network 104 to a second escrow digital wallet 116 of the first blockchain network 102 via the cross-chain communications network 112. The first escrow digital wallet 108 and the second escrow digital wallet 116 may be associated with a same or different trusted third party (not shown).

In response to detecting that the balance monitored represents the trade value, the first blockchain network 102 may be configured to transfer, simultaneously, (i) the NFT 106 from the first escrow digital wallet 108 to a first digital wallet 118 of the first blockchain network 102, the first digital wallet 118 owned by the buyer 114, and (ii) the balance of fungible tokens from the second escrow digital wallet 116 to a second digital wallet 120 of the second blockchain network 104 via the cross-chain communications network 112. The second digital wallet 120 may be owned by the seller 114. The NFT 110 may represent a nonfungible physical asset 122 owned by the seller 110 and wherein ownership of the nonfungible physical asset 122 is transferred from the seller 110 to the buyer 114 due to completion of the transfer of (i) and (ii).

The second blockchain network 104 may be configured to transfer 124 the fungible tokens, owned by the buyer 114, from a third digital wallet 126 of the second blockchain network 104 to the second escrow digital wallet 116, the third digital wallet 126 owned by the buyer 114. The second blockchain network 104 may be configured to transfer 124 the fungible tokens from the third digital wallet 126 to the second escrow digital wallet 116, via the cross-chain communications network 112, based on a first smart contract (not shown).

The first blockchain network 102 may be configured to transfer 128 the balance of fungible tokens from the second escrow digital wallet 116 to the second digital wallet 120, via the cross-chain communications network 112, based on a second smart contract (not shown). The first smart contract may be configured to cause the second blockchain network 104 to transfer the fungible tokens from the third digital wallet 126 to the second escrow digital wallet 116 by causing the second blockchain network 104 to perform multiple fungible token transfers each associated with a respective value that is less than the trade value.

The NFT 106 may be associated with an expiration term and, in an event exchange of the NFT 106 is not completed before the expiration term expires, an example embodiment may "unwind" the example in progress. For example, in an event the expiration term expires, the first blockchain network 102 may be further configured to transfer 129 the balance of fungible tokens from the second escrow digital wallet 116 of the first blockchain network 102 to the third digital wallet 126 of a second blockchain network 104. The first blockchain network 102 may be further configured to transfer the NFT 106 from the first escrow digital wallet 108 to a fourth digital wallet (not shown) of the first blockchain network 102. The fourth digital wallet may be owned by the seller 110.

According to an example embodiment, the first blockchain network 102 may be further configured to detect expiry of the expiration term via a smart contract. Further the first blockchain network 102 may be further configured to employ a smart contract to perform the monitor, detect, and transfer operations. Blockchain networks can be used for "smart contracts," scripts that automatically execute when certain conditions are met.

For example, a smart contract may be employed to determine whether pre-determined conditions are met that prove someone owns a cryptocurrency and has authority to send money they claim to own. Smart contracts have numerous uses and may require more than one set of inputs to trigger a transaction. The smart contracts may be written in any suitable programming language, such as the programming language "Solidity" on the basis of If-This-Then-That (IFTTT) logic. Such smart contracts may be employed in a computer-implemented method for blockchain cross-chain nonfungible token exchange, such as disclosed below with regard to FIG. 2.

Figure 2:
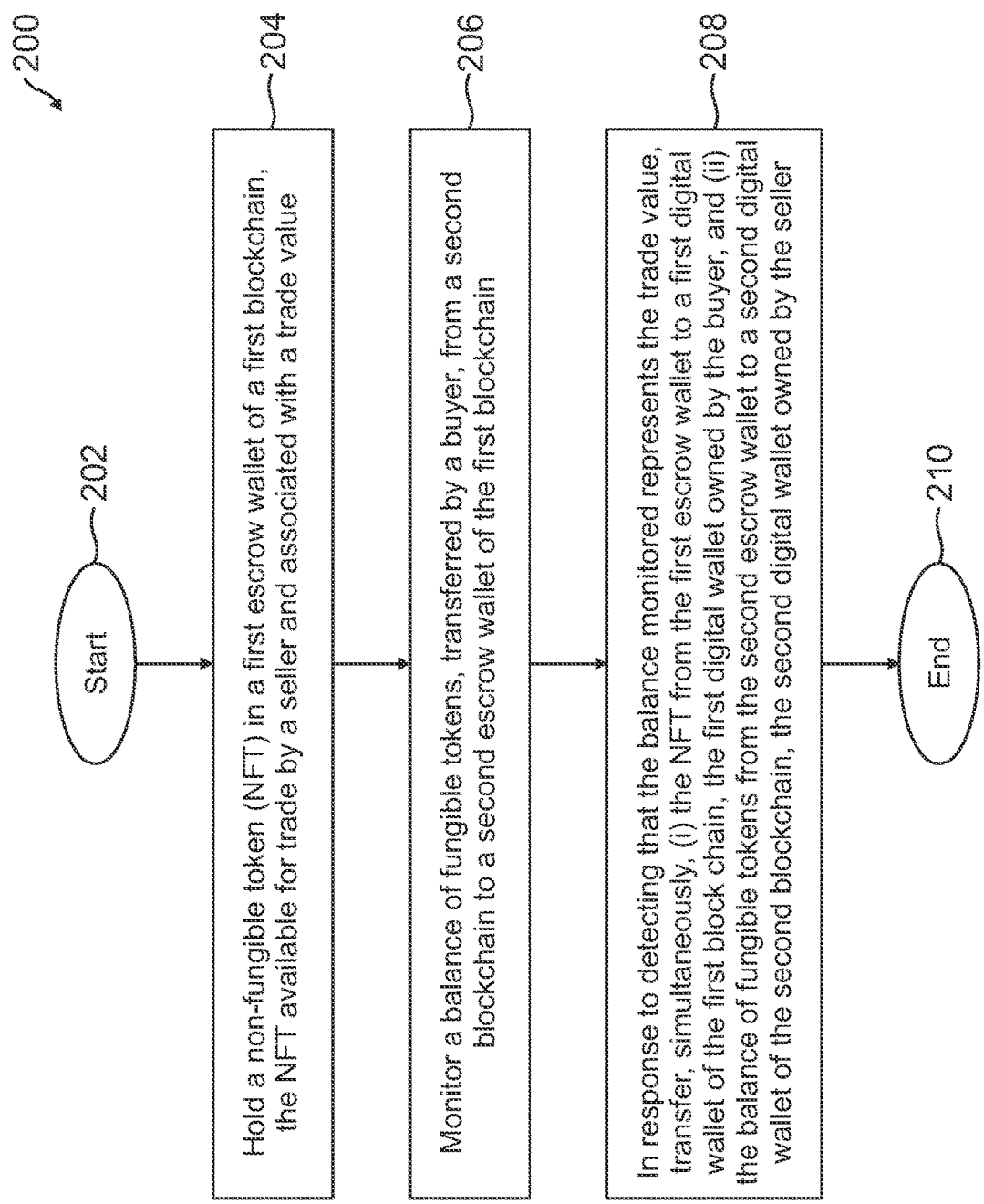
FIG. 2 is a flow diagram of an example embodiment of a computer-implemented method for blockchain cross-chain nonfungible token exchange.

FIG. 2 is a flow diagram 200 of an example embodiment of a computer-implemented method for blockchain cross-chain nonfungible token exchange. The computer-implemented method begins (202) and holds a nonfungible token (NFT) in a first escrow digital wallet of a first blockchain network, the NFT available for trade by a seller and associated with a trade value (204). The computer-implemented method monitors a balance of fungible tokens owned by a buyer and transferred from a second blockchain network to a second escrow digital wallet of the first blockchain network (206). In response to detecting that the balance monitored represents the trade value, the computer-implemented method transfers, simultaneously, (i) the NFT from the first escrow digital wallet to a first digital wallet of the first blockchain network, the first digital wallet owned by the buyer, and (ii) the balance of fungible tokens from the second escrow digital wallet to a second digital wallet of the second blockchain network, the second digital wallet owned by the seller (208), and the computer-implemented method thereafter ends (210) in the example embodiment.

The computer-implemented method may transfer the fungible tokens, owned by the buyer, from a third digital wallet of the second blockchain network to the second escrow digital wallet, the third digital wallet owned by the buyer.

The computer-implemented method may transfer the fungible tokens from the third digital wallet to the second escrow digital wallet via a cross-chain communications network and transfer the balance of fungible tokens from the second escrow digital wallet to the second digital wallet via the cross-chain communications network. Transferring the fungible tokens from the third digital wallet to the second escrow digital wallet may include performing multiple fungible token transfers each associated with a respective value that is less than the trade value.

The NFT may be associated with an expiration term. In an event the expiration term expires, the computer-implemented method may transfer the balance of fungible tokens from the second escrow digital wallet of the first blockchain network to a third digital wallet of a second blockchain network, the third digital wallet owned by the buyer; and transferring the NFT from the first escrow digital wallet to a fourth digital wallet of the first blockchain network. The fourth digital wallet may be owned by the seller.

The computer-implemented method may detect expiry of the expiration term. The detecting may be performed via a smart contract. The monitoring, detecting, and transferring may be performed via a smart contract.

Figure 3:
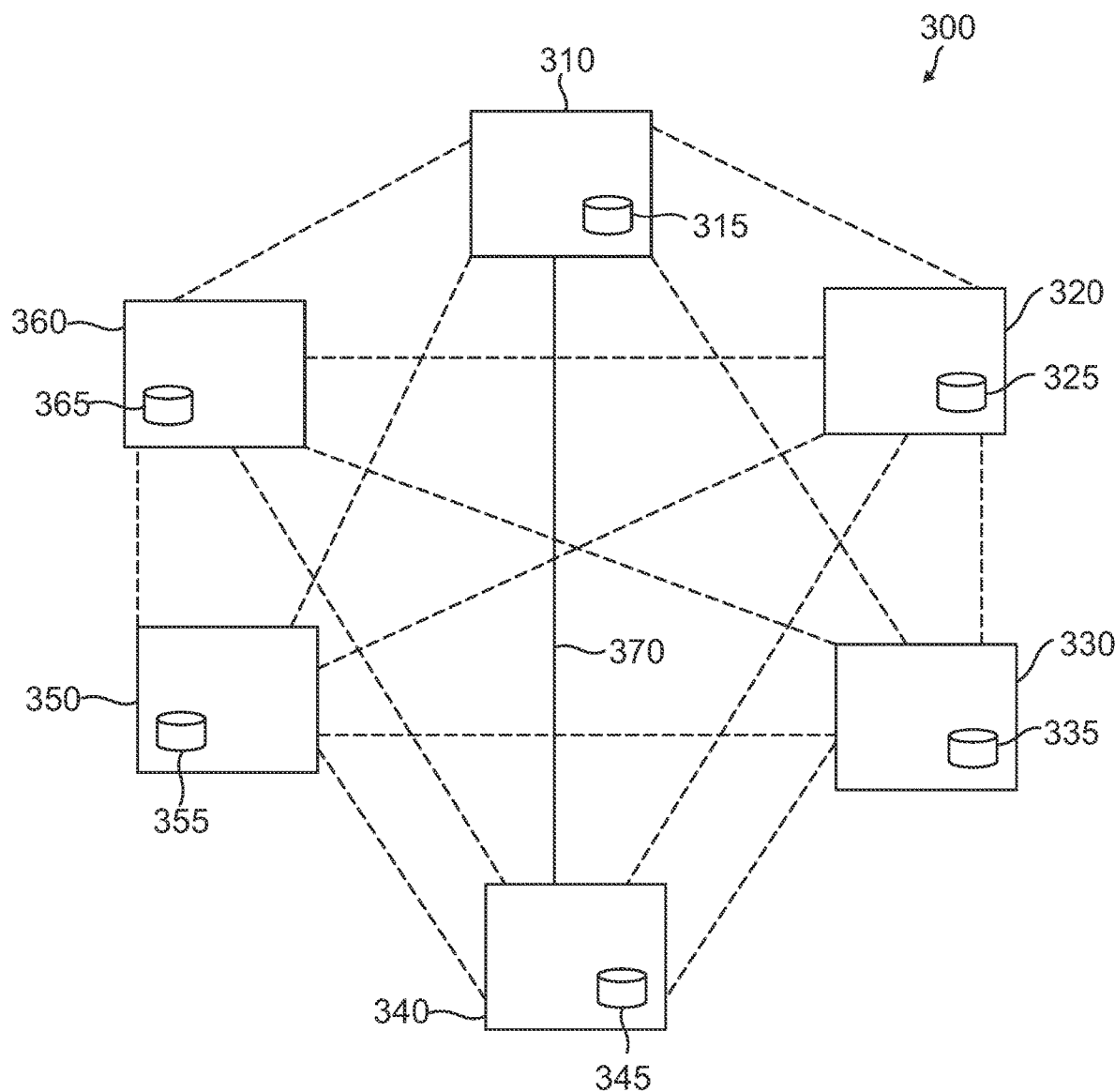
FIG. 3 is a block diagram of an example embodiment of a distributed blockchain ledger computer-implemented system.

FIG. 3 is a block diagram of an example embodiment of a blockchain network 300, also referred to interchangeably herein as a distributed ledger network 300, that may be accessed according to an example embodiment. The blockchain network 300 may be employed as the blockchain network 102 and/or the blockchain network 104 of FIG. 1, disclosed above. The blockchain network 300 is a distributed ledger peer-to-peer network and is valuable because this network enables trustworthy processing and recording of transactions without the need to fully trust any user (e.g., person, entity, program, and the like) involved in the transactions, reducing the need for trusted intermediaries to facilitate the transaction. Existing applications use the distributed ledger network 300 to transfer and record, in the form of blockchain based records, movement of tokens. Such blockchain based records form a cryptographically secured backlinked list of blocks.

The distributed ledger network 300 comprises multiple computing devices configured as nodes 310, 320, 330, 340, 350, 360 of the distributed ledger network 300. Each node 310, 320, 330, 340, 350, 360 locally stores and maintains a respective identical copy 315, 325, 335, 345, 355, 365 of the blockchain ledger in memory communicatively coupled to the node. The nodes exchange messages within in the distributed ledger network 300 to update and synchronize the ledger stored and maintained by each node. The nodes may also execute decentralized applications (e.g., via smart contracts) for processing the messages. A message transmission 370 from node 310 to node 340 may be used to exchange a token in the distributed ledger network 300 as shown in FIG. 3. The dotted lines between each set of nodes in the distributed ledger network 300 indicate similar transmissions that may be exchanged between any other set of nodes in the distributed ledger network 300. The messages may include a confirmed transfer for recording data associated with the token being transferred, a blockchain public key for each of the one or more parties participating in the transfer.

Referring back to FIG. 1, according to an example embodiment, the first blockchain network 102 or the second blockchain network 104 may be an Ethereum network; however, it should be understood that the first blockchain network 102 and the second blockchain network 104 may be any suitable blockchain networks. Ethereum is a decentralized network of computers with two basic functions, a blockchain that can record transactions and a virtual machine, that is, an Ethereum Virtual Machine (EVM), that can produce smart contracts. Because of these two functions, Ethereum is able to support decentralized applications (DApps). These DApps are built on the existing Ethereum blockchain, piggybacking off of its underlying technology. In return, Ethereum charges developers for the computing power in their network, which can only be paid in Ether, the only inter-platform currency. Depending on its purpose, a DApp may create ERC20 tokens to function as a currency. According to an example embodiment, fungible tokens disclosed herein may be ERC20 tokens or any other suitable fungible token.

The code of the smart contract may be uploaded on the EVM, that may be a universal runtime compiler or browser, to execute the smart contract's code. Once the code is on the EVM, the code may be the same across each Ethereum node to be run to check whether the conditions are met, such as a condition for the balance reaching the trade value prior to expiration of the expiration term.

Ethereum has a long history of developed standards. For example, the Ethereum Request for Comment (ERC) issue number 20, that is, ERC20, is a standard that defines a set of six functions that other smart contracts within the Ethereum ecocomputer-implemented system can understand and recognize. ERC20 is a protocol standard and in order to be ERC20 compliant, the functions need to be included in the token's smart contract. ERC20 outlines a specific list of rules that a given Ethereum based token has to deploy, simplifying the process of programming the functions of tokens on Ethereum's blockchain. These include, for instance, how to transfer a token (by the owner or on behalf of the owner), such as may be employed for transferring fungible tokens of the buyer, and how to access data (name, symbol, supply, balance) about the token, such as the balance of the fungible token in the second escrow digital wallet 116.

Figure 4:
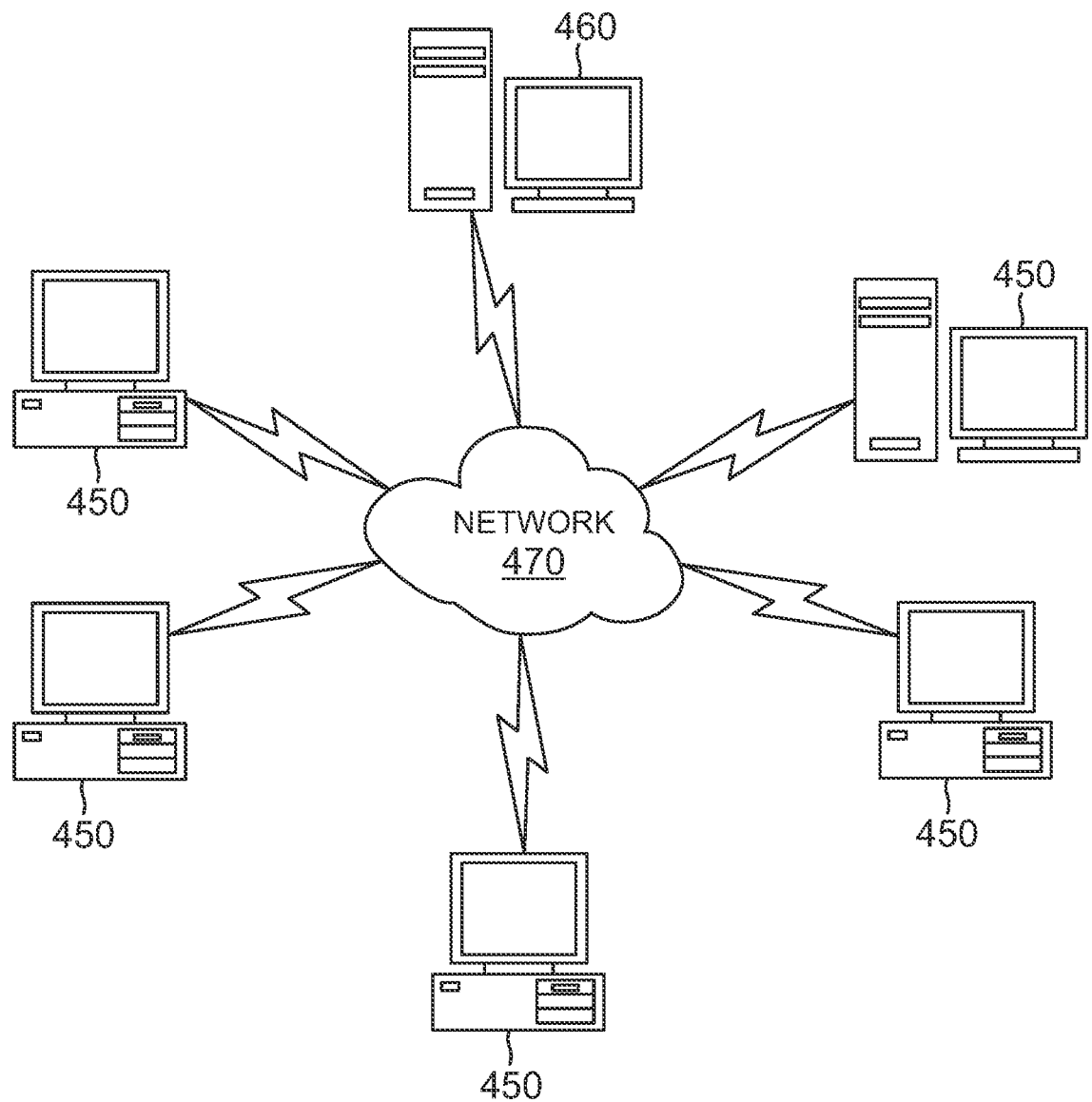
FIG. 4 is a block diagram of an example embodiment of a digital processing environment in which an example embodiment may be implemented.

FIG. 4 is a block diagram of an example digital processing environment in which an example embodiment may be implemented. Client computers/devices 450 and server computers/devices 460 provide processing, storage, and input/output devices executing application programs and the like.

Client computers/devices 450 are linked through communications network 470 to other computing devices, including other client computers/devices 450 and server computer(s) 460. The network 470 can be part of a remote access network, a global network (e.g., the Internet), a worldwide collection of computers, Local area or Wide area networks, and gateways that may use respective protocols (e.g., TCP/IP, Bluetooth, etc.) to communicate with one another. Other electronic device/computer network architectures are suitable. For example, client computers/devices 450 may include nodes shown in FIG. 3, which run user applications that enable a user to communicate with an application to determine whether a user meets a work requirement. A digital wallet may be configured on each user device 310, 320 to store tokens. Client computers 350 of the computer-implemented system 100 may be configured with a trusted execution environment (TEE) or trusted platform module (TPM), where the application may be run and the digital wallet of a user may be stored.

Server computers 460 of the computer-implemented system may be configured to include a server that that executes the application. For example, the application of the server computer 460 may determine whether a user has satisfied a work requirement and produce a determination result and pair, in computer memory, an indication of the determination result with an identifier of the user or an identifier of a digital asset of the user, such as an address of a digital wallet owned by the user. The application of the server computer 460 also facilitates a transfer of a utility token by moving the utility token to, for example, a wallet. For another example, server computers 460 or client devices 450 may comprise peer computing devices (nodes) 310, 320, 330, 340, 350, 360 of a distributed blockchain ledger 300 of FIG. 3, which use smart contracts to execute and record transactions implemented via tokens.

Figure 5:
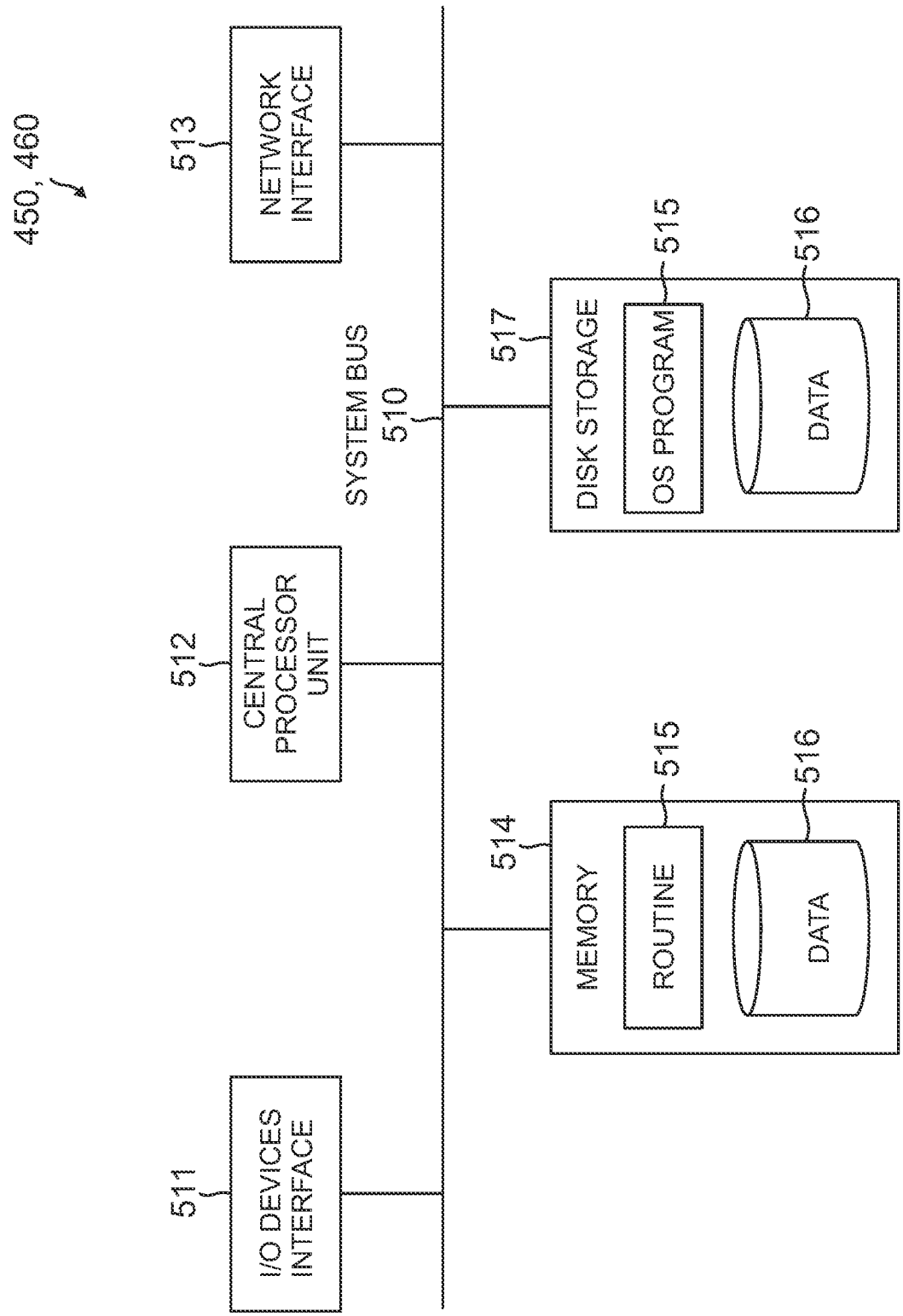
FIG. 5 is a block diagram of an example embodiment of an internal structure of a computer/computing node in the example embodiment of FIG. 4.

FIG. 5 is a block diagram of an example embodiment of an internal structure of a computer/computing node (e.g., client processor/device/mobile phone device/tablet/video camera, or computer 450, 460) in the digital processing environment of FIG. 4, which may be used to facilitate displaying audio, image, video or data signal information. An example embodiment may include means for displaying audio, image, video or data signal information. The computer 450, 460 in FIG. 5 may include a computer-implemented system bus 510, where a bus is a set of actual or virtual hardware lines used for data transfer among the components of a computer or processing computer-implemented system. Bus 510 is essentially a shared conduit that connects different elements of a computer computer-implemented system (e.g., processor, disk storage, memory, input/output ports, etc.) that enables the transfer of data between the elements.

Coupled to the computer-implemented system bus 510 is an I/O device interface 511 for connecting various input and output devices (e.g., keyboard, mouse, touch screen interface, displays, printers, speakers, audio inputs and outputs, video inputs and outputs, microphone jacks, etc.) to the computer 450, 460. The network interface 513 allows the computer to connect to various other devices attached to a network, such as the network 470 of FIG. 4, disclosed above. The memory 514 provides volatile storage for computer software instructions 515 and data 516 used to implement applications and software implementations of components.

Software components 514, 515 of the computer-implemented system may be configured using any known programming language, including any high-level, object-oriented programming language. The computer-implemented system may include instances of processes that enable execution of transactions and recordation of transactions. The computer-implemented system may also include instances of a scoring engine, which can be implemented by the server 460 or a client that communicates to the server 460 using, for example, secure sockets layer (SSL), or any other suitable protocol.

In an example mobile implementation, a mobile agent implementation may be provided. A client-server environment can be used to enable mobile services using a network server. It can use, for example, the Extensible Messaging and Presence Protocol (XMPP) to tether an agent 515 on the device 450 to the server 460. The server 460 can then issue commands to the mobile device on request. The mobile user interface framework used to access certain components of the computer-implemented system 501 may be based on XHP, Javelin, or WURFL. In another example mobile implementation for OS X and iOS operating computer-implemented systems and their respective APIs, Cocoa and Cocoa Touch may be used to implement the client-side components 515 using Objective-C or any other high-level programming language that adds Smalltalk-style messaging to the C programming language.

The disk storage 517 provides non-volatile storage for computer software instructions 515 (equivalently "OS program") and data 516 used to implement embodiments of the computer-implemented system. The central processor unit 512 is also coupled to the computer-implemented system bus 510 and provides for the execution of computer instructions.

According to an example embodiment, the processor routines 515 and data 516 are computer program products, e.g. application, smart contracts, and scoring engine (generally referenced 515), including a computer readable medium capable of being stored on a storage device 517, which provides at least a portion of the software instructions for the computer-implemented system. Executing instances of respective software components of the computer-implemented system, such as instances of the application, smart contracts, and scoring engine may be implemented as computer program products 515, and can be installed by any suitable software installation procedure, as is well known in the art. In another example embodiment, at least a portion of the computer-implemented system software instructions 515 may also be downloaded over a cable, communication and/or wireless connection via, for example, a browser SSL session or through an app (whether executed from a mobile or other computing device). According to another example embodiment, the computer-implemented system software components 515 may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may provide at least a portion of the software instructions for the computer-implemented system.

An example embodiment includes device code executed in the TEE or TPM. The TEE or TPM is a hardware environment that runs instructions and stores data outside the main operating computer-implemented system (OS) of a device. This protects sensitive code and data from malware or snooping with purpose-built hardware governed by an ecocomputer-implemented system of endorsements, beginning with the device manufacturer. The computer-implemented system may perform checks on the TEE or TPM, such as executing BIOS checks, to verify that the folders (e.g., wallets) stored in the TEE/TPM have not been altered by malicious actors.

Further example embodiments disclosed herein may be configured using a computer program product; for example, controls may be programmed in software for implementing example embodiments. Further example embodiments may include a non-transitory computer-readable medium containing instructions that may be executed by a processor which, when loaded and executed, cause the processor to complete methods described herein. It should be understood that elements of the block and flow diagrams may be implemented in software or hardware, such as via one or more arrangements of circuitry of FIG. 5, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. A system for blockchain cross-chain nonfungible token (NFT) exchange, the system comprising:
   a first blockchain network, the first blockchain network including a first plurality of nodes, wherein each node of the first plurality of nodes includes a first node computer processor, a first node memory coupled with the first node computer processor, the first node memory including a first smart contract storing first instructions that, when executed by the first node computer processor, cause the first node computer processor to:
      mint a NFT, the NFT being a unique cryptographic digital asset that is non-interchangeable, the NFT configured with an expiration term that causes an electronic exchange of the NFT to revert in response to expiration of the expiration term, the NFT available for electronic exchange via the first client device and associated with a threshold value;
      checking whether one or more conditions are met, including a condition for a level of fungible tokens reaching the threshold value prior to the expiration of the expiration term of the NFT;
      transfer the NFT from the fourth digital wallet of the first blockchain network to the first escrow digital wallet of the first blockchain network;
      transfer, via a cross-chain communication network coupling the first blockchain network to the second blockchain network, the fungible tokens from the third digital wallet of the second blockchain network to the second escrow digital wallet of the first blockchain network;
      monitor a level of fungible tokens associated with the second client device in the second escrow digital wallet of the first blockchain network; and
      in response to detecting that the level monitored represents the threshold value, electronically transferring, simultaneously, (i) the NFT from the first escrow digital wallet of the first blockchain network to the first digital wallet of the first blockchain network, and (ii) the fungible tokens from the second escrow digital wallet of the first blockchain network to the second digital wallet of the second blockchain network via the cross-chain communication network;
   a second blockchain network, the second blockchain network including a second plurality of nodes, wherein each node of the second plurality of nodes includes a second node computer processor, a second node memory coupled with the second node computer processor, the second node memory including a second smart contract storing second instructions that, when executed by the second node computer processor, cause the second node computer processor to transfer, via the cross-chain communication network, the fungible tokens from the third digital wallet of the second blockchain network to the second escrow digital wallet of the first blockchain network;
   a first client device, the first client device comprising a first computer processor comprising a first trusted execution environment (TEE), and a first memory coupled to the first computer processor, the first memory storing first device code, a second digital wallet of the second blockchain network, and a fourth digital wallet of the first blockchain network, the first TEE storing a first escrow digital wallet of the first blockchain network as configured by the first device code,
      wherein the first TEE is configured by the first escrow digital wallet of the first blockchain network to:
         receive, via the first smart contract, the NFT from the fourth digital wallet of the first blockchain network;
         hold, temporarily, the NFT; and
         in response to the first smart contract detecting that the level monitored represents the threshold value, transfer, via the first smart contract, the NFT to the first digital wallet of the first blockchain network;
      wherein the first computer processor is configured by the second digital wallet of the second blockchain network to in response to the first smart contract detecting that the level monitored represents the threshold value, receive, via the cross-chain communication network, the fungible tokens from the second escrow digital wallet of the first blockchain network; and
      wherein the first computer processor is configured by the fourth digital wallet of the first blockchain network to transfer, via the first smart contract, the NFT to the first escrow digital wallet of the first blockchain network; and a second client device, the second client device comprising a second computer processor comprising a second trusted execution environment (TEE), and a second memory coupled to the second computer processor, the second memory storing second device code, a first digital wallet of the first blockchain network, and a third digital wallet of the second blockchain network, the second TEE storing a second escrow digital wallet of the first blockchain network as configured by the second device code, wherein the second TEE is configured by the second escrow digital wallet of the first blockchain network to:

receive, via the cross-chain communication network, the fungible tokens from the third digital wallet of the second blockchain network;

hold, temporarily, the fungible tokens; and in response to the first smart contract detecting that the level monitored represents the threshold value, transfer, via the cross-chain communication network, the fungible tokens to the second digital wallet of the second blockchain network;

wherein the second computer processor is configured by the first digital wallet of the first blockchain network to in response to the first smart contract detecting that the level monitored represents the threshold value, receive, via the first smart contract, the NFT from the first escrow digital wallet of the first blockchain network; and wherein the second computer processor is configured by the third digital wallet of the second blockchain network to transfer, via the cross-chain communication network, the fungible tokens to the second escrow digital wallet of the first blockchain network.

2. The system of claim 1, wherein the nonfungible token (NFT) represents a nonfungible physical asset associated with the first client device and wherein attribution of the nonfungible physical asset is transferred from the first client device to the second client device due to completion of the transfer of (i) and (ii).

3. The system of claim 1, wherein the first and second escrow digital wallets are associated with a same or different trusted third party.

4. The system of claim 1, wherein the first smart contract is configured to cause the second blockchain network to transfer the fungible tokens from the third digital wallet to the second escrow digital wallet by causing the second blockchain network to perform multiple fungible token transfers each associated with a respective value that is less than the threshold value.

5. The system of claim 1, wherein, in an event of the expiration of the expiration term of the nonfungible token (NFT), the first blockchain network is further configured to:

transfer the fungible tokens from the second escrow digital wallet of the first blockchain network to the third digital wallet of the second blockchain network, the third digital wallet associated with the second client device; and transfer the nonfungible token (NFT) from the first escrow digital wallet to the fourth digital wallet of the first blockchain network, the fourth digital wallet associated with the first client device.

6. The system of claim 5, wherein the first blockchain network is further configured to detect the expiration of the expiration term of the nonfungible token (NFT) via the first smart contract first instructions.

7. The system of claim 1, wherein the first blockchain network is further configured to employ the first smart contract first instructions to perform the monitor, detect, and transfer operations.

8. The system of claim 1, wherein the cross-chain communications network is based on at least one of a Polkadot, Cosmos, International Blockchain Consulting (IBC), or Interledger network.

9. The system of claim 1, wherein the threshold value comprises a trade value.

10. The system of claim 1, wherein the first and second trusted execution environment (TEE) comprises a trusted platform module (TPM).

11. The system of claim 1, wherein the first and second device code being configured to store the first and second escrow digital wallet in the first and second trusted execution environment (TEE) of the first and second client device includes configuring the first and second trusted execution environment (TEE) to protect the first and second device code and data stored in the first and second escrow digital wallet from malware or snooping with purpose-built hardware controlled by a computer-implemented system of endorsements, the computer-implemented system of endorsements configured to execute Basic Input/Output System (BIOS) checks that verify that the first and second escrow digital wallet stored in the first and second trusted execution environment (TEE) is not altered by a malicious device or process.

\* \* \* \* \*